United States Patent
Ahn et al.

(10) Patent No.: US 10,931,398 B2
(45) Date of Patent: Feb. 23, 2021

(54) METHOD AND DEVICE FOR TRANSMITTING CONTROL INFORMATION BY USING POLAR CODE

(71) Applicant: LG ELECTRONICS INC., Seoul (KR)

(72) Inventors: Joonkui Ahn, Seoul (KR); Kijun Kim, Seoul (KR); Bonghoe Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/467,028

(22) PCT Filed: Dec. 6, 2017

(86) PCT No.: PCT/KR2017/014187
§ 371 (c)(1),
(2) Date: Jun. 5, 2019

(87) PCT Pub. No.: WO2018/106001
PCT Pub. Date: Jun. 14, 2018

(65) Prior Publication Data
US 2019/0305874 A1 Oct. 3, 2019

Related U.S. Application Data

(60) Provisional application No. 62/430,894, filed on Dec. 6, 2016.

(51) Int. Cl.
*H04B 7/00* (2006.01)
*H04L 1/00* (2006.01)
*H04L 5/00* (2006.01)
*H04W 72/12* (2009.01)

(52) U.S. Cl.
CPC ............... *H04L 1/001* (2013.01); *H04L 1/00* (2013.01); *H04L 1/0057* (2013.01); *H04L 5/0046* (2013.01); *H04W 72/12* (2013.01)

(58) Field of Classification Search
CPC ..... H04W 28/06; H04W 28/10; H04W 72/04; H04W 72/046; H04W 72/0466
USPC .................... 370/310, 328–330, 431, 441
See application file for complete search history.

(56) References Cited

U.S. PATENT DOCUMENTS

| | | | | |
|---|---|---|---|---|
| 9,628,114 B2* | 4/2017 | Huang | ................ | H03M 13/13 |
| 9,742,440 B2* | 8/2017 | El-Khamy | ........ | H03M 13/6368 |
| 9,917,675 B2* | 3/2018 | Kudekar | ............... | H04L 1/0045 |
| 10,171,204 B2* | 1/2019 | Wu | ....................... | H04L 1/0068 |
| 10,348,450 B2* | 7/2019 | Rong | .................... | H04L 1/0058 |

(Continued)

OTHER PUBLICATIONS

PCT International Application No. PCT/KR2017/014187, International Search Report dated Mar. 9, 2018, 4 pages.

(Continued)

*Primary Examiner* — Dmitry Levitan
(74) *Attorney, Agent, or Firm* — Lee Hong Degerman Kang Waimey

(57) ABSTRACT

Provided are a method and a device for transmitting control information by using a polar code. The device generates a codeword by encoding information bits indicating control information by using the polar code, and transmits the whole or a part of the codeword through a control channel A block size of the polar code is determined according to a reference coding rate for the control channel.

6 Claims, 4 Drawing Sheets

(56) References Cited

U.S. PATENT DOCUMENTS

| | | | |
|---|---|---|---|
| 10,484,130 B2* | 11/2019 | Zhang | H04L 1/0058 |
| 2016/0285479 A1 | 9/2016 | El-Khamy et al. | |
| 2016/0294418 A1 | 10/2016 | Huang et al. | |
| 2017/0353267 A1* | 12/2017 | Kudekar | H04L 1/0061 |
| 2018/0375615 A1* | 12/2018 | Xu | H03M 13/13 |
| 2019/0207710 A1* | 7/2019 | Ye | H04L 1/1819 |
| 2019/0215720 A1* | 7/2019 | Li | H04W 28/06 |
| 2019/0296776 A1* | 9/2019 | Xu | H03M 13/6356 |
| 2019/0305874 A1* | 10/2019 | Ahn | H04W 72/12 |
| 2020/0187166 A1* | 6/2020 | Xu | H04L 1/0057 |

OTHER PUBLICATIONS

Huawei, et al., "Details of the Polar code design", 3GPP TSG RAN WG1 Meeting #87, R1-1611254, Nov. 2016, 17 pages.

Huawei, et al., "Polar code design and rate matching", 3GPP TSG RAN WG1 Meeting #86, R1-167209, Aug. 2016, 7 pages.

Interdigital, "Performance Evaluation of Puncturing Schemes for Polar Codes", 3GPP TSG RAN WG1 Meeting #86bis, R1-1609898, Oct. 2016, 8 pages.

\* cited by examiner

METHOD AND DEVICE FOR TRANSMITTING CONTROL INFORMATION BY USING POLAR CODE

CROSS-REFERENCE TO RELATED APPLICATIONS

This application is the National Stage filing under 35 U.S.C. 371 of International Application No. PCT/KR2017/014187, filed on Dec. 6, 2017, which claims the benefit of U.S. Provisional Application No. 62/430,894, filed on Dec. 6, 2016, the contents of which are hereby incorporated by reference herein in its entirety.

BACKGROUND OF THE INVENTION

Field of the Invention

The present invention relates to wireless communication, and more particularly, to a method for transmitting control information in a wireless communication system, and an apparatus using the method.

Related Art

In the 3rd generation partnership project (3GPP), the overall scheduling and concept for the 5th generation (5G) standard was agreed in the workshop held in September 2015. Enhanced mobile broadband (eMBB), massive machine type communications, ultra-reliable and low latency communication (URLLC), or the like was defined as a top-level use case. In the 3GPP, it was determined to define a new radio (NR) different from the existing long term evolution (LTE) in order to satisfy a service scenario and a new requirement, and both the LTE and the NR were defined as a 5G wireless access technique.

A maximum amount of data that can be transmitted on a communication channel defined mathematically was defined by Shannon in 1948, and was named as channel capacity. A polar code proposed by E. Arikan ("Channel Polarization: A Method for Constructing Capacity-Achieving Codes for Symmetric Binary-Input Memoryless Channels, IEEE TRANSACTIONS ON INFORMATION THEORY, VOL. 55, NO. 7, July 2009) in Turkey is a code for asymptotically achieving channel capacity communication for the first time while having practical complexity in a typical channel.

While the 3GPP LTE has used a convolutional code or a turbo code, the introduction of the polar code is underway in the 3GPP NR.

SUMMARY OF THE INVENTION

The present invention provides a method for transmitting control information in a wireless communication system and a device using the method.

In an aspect, A method for transmitting control information in a wireless communication system is provided. The method includes determining, by a transmitter, a block size of a polar code, generating, by the transmitter, a codeword by encoding information bits indicating the control information by using the polar code, and transmitting, by the transmitter, the entirety or part of the codeword to a receiver through a control channel. The block size is determined based on a reference code rate for the control channel.

In another aspect, a device for transmitting control information in a wireless communication system includes a transceiver configured to transmit and receive a radio signal, and a processor operatively coupled to the transceiver. The processor is configured to determine a block size of a polar code, generate a codeword by encoding information bits indicating the control information by using the polar code, and transmit the entirety or part of the codeword through a control channel by using the transceiver. The block size is determined based on a reference code rate for the control channel.

It is possible to transmit a control channel with various payload sizes by using a polar code.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

Figure 1:
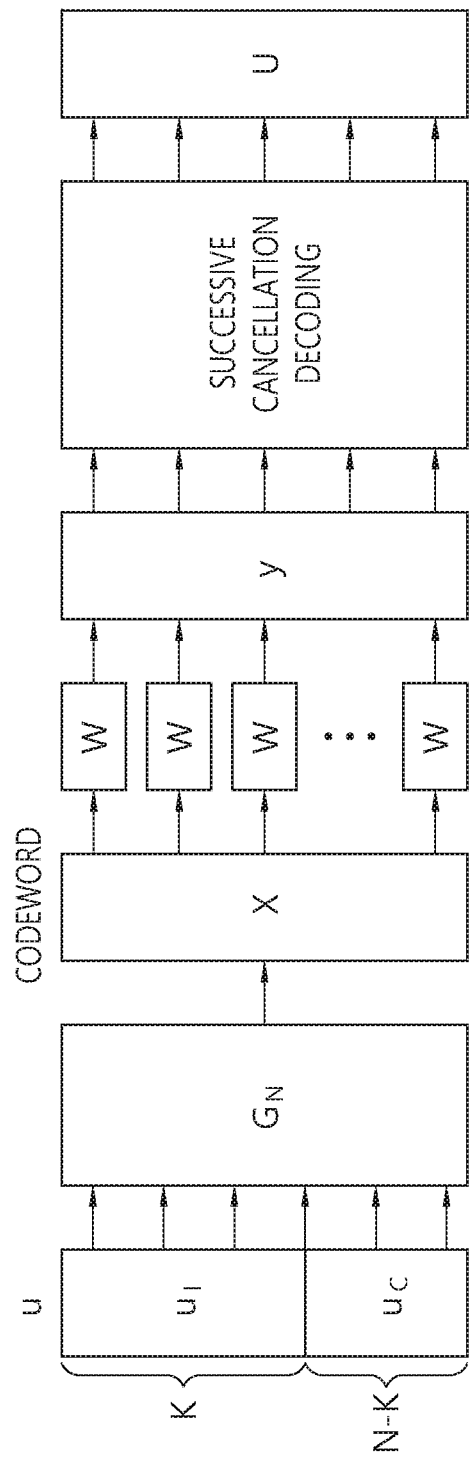
FIG. 1 shows an example of encoding and decoding of a polar code.

FIG. 1 shows an example of encoding and decoding of a polar code.

A binary-input discrete memoryless channel (B-DMC) is assumed. A block size is N under the assumption that a codeword size is N and a channel is used N times. There are N independent channels W to transmit a single codeword. In addition, channel polarization is acquired through channel combining and channel splitting.

An input vector u is a binary vector with a length N. An information bit consists of K bits, and a frozen bit consists of the remaining (N−K) bits. Positions of the information bits and frozen bits in the input vector are for exemplary purposes only, and are not limited thereto. The front bits may be arranged ahead of the information bits, or the front bits and the information bits may be arranged according to any input sequence. For example, assume that a length of the input vector is 8, and the number of information bits is 6. In an input sequence of {1, 1, 1, 1, 0, 1, 1, 0}, '1' may indicate a position at which the information bit is arranged, and '0' may indicate a position at which the front bit is arranged.

The frozen bit is also called as a dummy bit, and is a bit which is pre-known to both a transmitter and a receiver. A codeword X is generated by multiplying the input vector u by a coding matrix $G_N$. The coding matrix $G_N$ is obtained by a Kronecker product of $G_2$.

$$G_2 = \begin{bmatrix} 1 & 0 \\ 1 & 1 \end{bmatrix} \quad \text{[Equation 1]}$$

$$G_4 = G_2 \otimes G_2 = \begin{bmatrix} 1 & 0 & 0 & 0 \\ 1 & 0 & 1 & 0 \\ 1 & 1 & 0 & 0 \\ 1 & 1 & 1 & 1 \end{bmatrix} \quad \text{[Equation 2]}$$

$$G_8 = G_2 \otimes G_2 \otimes G_2 = \begin{bmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 0 & 1 & 1 & 0 \\ 1 & 1 & 1 & 1 & 1 & 1 & 1 & 1 \end{bmatrix} \quad \text{[Equation 3]}$$

The codeword X is transmitted by using the channel W N times. The receiver performs decoding by using a reception vector y to obtain a vector U which is a predicted from an information vector u. A successive cancellation decoder may be used to decode a polar code. The successive cancellation decoder performs decoding sequentially starting from $u_1$. Previous decoded bits are completely trusted. $u_i$ is decoded on the basis of the reception vector y and information of bits $U_1$ to $U_{i-1}$ of which decoding is previously complete. If $u_i$ is the frozen bit, decoding is performed as a pre-known bit.

When decoding is performed using the successive cancellation decoder, a unique phenomenon called channel polarization can be observed. Each channel from the information vector u to the estimate vector U is in an extremely good state or in an extremely bad state. In general, bits which are decoded first are biased to have low channel capacity, and bits which are decoded later converge to a complete channel Such a tendency can be inferred from a fact that the later bits require a greater amount of information when decoding is attempted in a successive cancellation decoding scheme. Therefore, in general, the decoder allocates the information bit by selecting only a good channel, and allocates the frozen bit to the remaining channels.

Now, it is proposed to apply a polar code in transmission of a data channel or control channel of 3GPP. The control channel may include a physical channel for transmitting information required for communication between two communication nodes, such as DL scheduling information, UL scheduling information, hybrid automatic repeat request (HARQ) ACK/NACK information, channel state information (CSI), power control information, or the like. The control channel includes a downlink (DL) control channel and/or an uplink (UL) control channel. In 3GPP LTE, the DL control channel may be a physical downlink control channel (PDCCH), or the like, and the UL control channel may be a physical uplink control channel (PUCCH) or the like.

Figure 2:
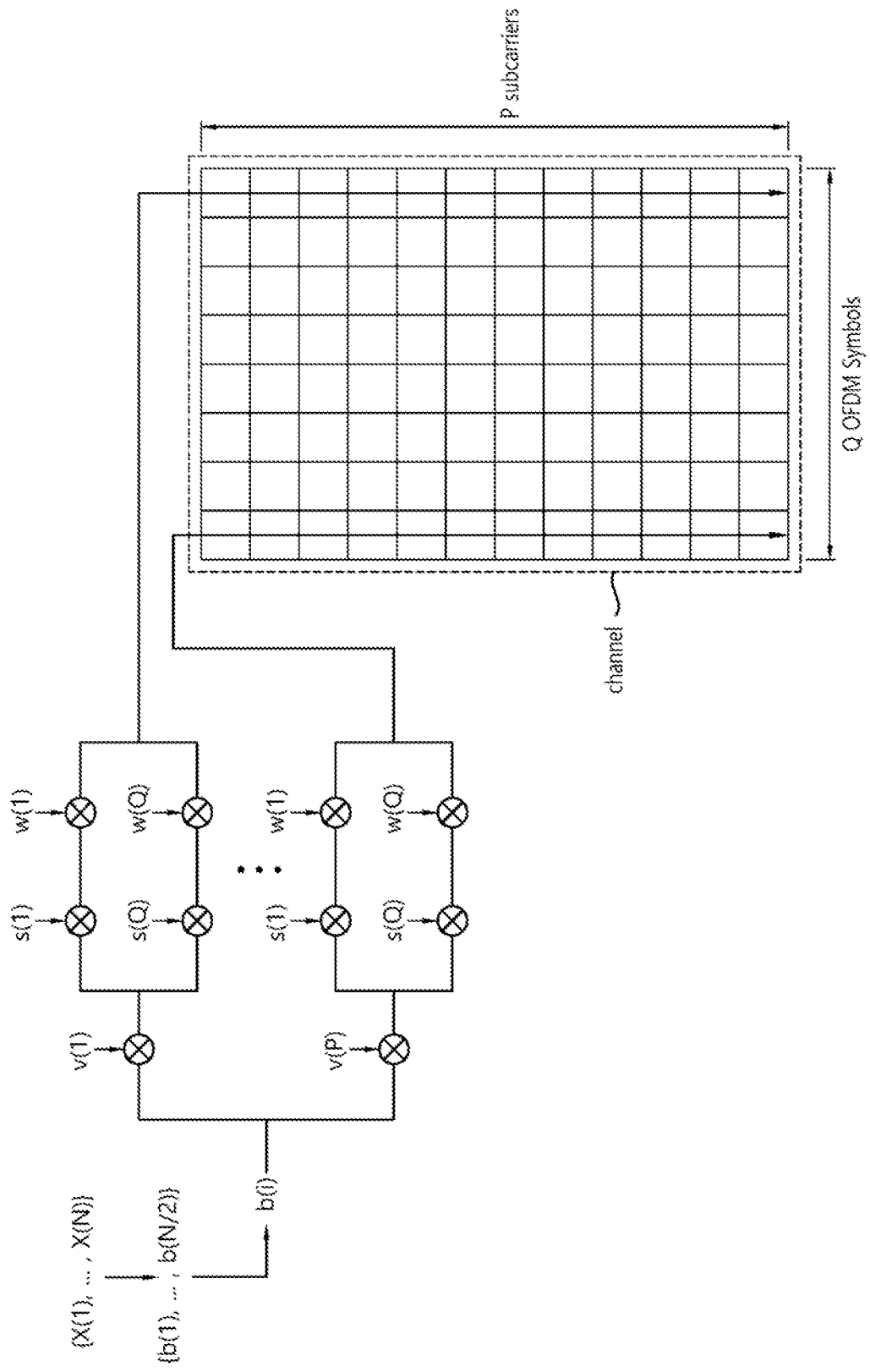
FIG. 2 shows an example of a channel to which an embodiment of the present invention is applied.

FIG. 2 shows an example of a channel to which an embodiment of the present invention is applied.

This channel is a UL control channel. Various payloads may be transmitted through P subcarriers and Q orthogonal frequency division multiplexing (OFDM) symbols. The values P and Q can be adjusted.

A codeword X with a size N is converted into N/2 modulation symbols through quadrature phase shift keying (QPSK) modulation. There is no restriction on the modulation scheme, and thus binary phase shift keying (BPSK), 8-PSK, or the like may also be used. Each modulation symbol is first multiplied by a spreading code $\{v(1), \ldots, v(P)\}$ of a size P. In addition, a sequence $\{s(1), \ldots, s(Q)\}$ of the size Q is multiplied, and then an orthogonal code $\{w(1), \ldots, w(Q)\}$ of the size Q is multiplied. Cyclic shift may be applied to the spreading code.

For convenience, the following definition is used to apply a polar code to a control channel.

K: the number of information bits input to the polar code

M: the number of bits to be actually transmitted through the control channel

R: a reference code rate of the control channel

N: A block size of the polar code or a size of the codeword or the number of bits of a mother code The values K and M may change for each control channel transmission. The control channel may be transmitted by combining a specific unit resource (e.g., control channel element (CCE)), and the number of bits that can be transmitted per unit resource may be fixed. If the number of unit resources for transmitting the control channel is defined as an aggregation level, the value M may be determined according to the aggregation level.

The above embodiment is merely an example of a control channel for carrying control information according to the present invention, and the present invention is not limited thereto. A plurality of modulation symbols generated by modulating information bits may be multiplied by a spreading code or a scrambling code, and thereafter may be transmitted by mapping a radio resource.

Figure 3:
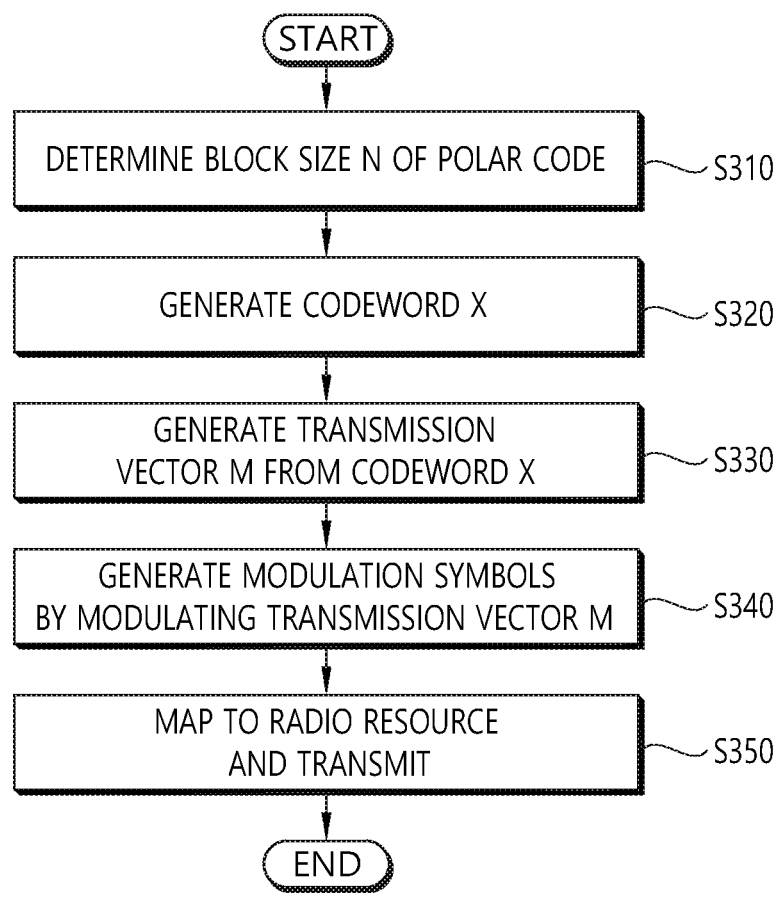
FIG. 3 shows a method of transmitting control information according to an embodiment of the present invention.

FIG. 3 shows a method of transmitting control information according to an embodiment of the present invention. This method may be performed by a transmitter, and the transmitter may be a wireless device or a base station.

In step S310, a block size N of a polar code is determined. This will be described later.

In step S320, an information bit u indicating control information is encoded using the polar code to generate a codeword X.

In step S330, according to M, a bit in the codeword X is punctured or added to generate a transmission vector M. Interleaving may be performed.

In step S340, the transmission vector M is modulated to generate a plurality of modulation symbols.

In step S350, the plurality of modulation symbols are mapped to a radio resource and are transmitted. Before mapping to the radio resource, if necessary, a spreading code or sequence may be multiplied to the modulation symbols.

Now, a method of determining a block size of a polar code will be described.

N may be limited to power of 2 or power of 3. When $G_N$ based on $G_2$ is used, N may be limited to a power of 2. Hereinafter, if the value N is expressed by N(i), it may be expressed as N(1)=2, N(2)=4, N(3)=8, etc.

In the input vector, the position of the information bit and the position of the frozen bit may be determined based on the value N independently from the value M.

In a first embodiment, the value N may be determined according to the value M. More specifically, N may be a minimum value of N(i), greater than M. A coding gain may increase when a position of the information/frozen bit is determined by setting a block size of a polar code to be close to M. M bits excluding (N−M) bits out of N bits of the polar code are transmitted as transmission bits.

Alternatively, N may be a maximum value of N(i), less than M. (M−N) bits are added to the output N bits of the polar code and then are transmitted. The added (M−N) bits may be selected from the output N bits.

In a second embodiment, the value N may be determined based on a maximum value of K which can be used in a system or a maximum value of K which is set in a device. Assume that $K_{max}$ is the maximum value of K which can be used in the system or the maximum value of K which is set in the device. The value N may be a maximum value of N(i) satisfying $K_{max}/N(i)$>R or a minimum value of N(i) satisfying $K_{max}/N(i)$<R. Information regarding the value R may be transferred from a base station to a wireless device through radio resource control (RRC) signaling or the like.

In a third embodiment, the value N may be determined based on a maximum value of M which can be used in the system or a maximum value of M which is set in the device. Assume that $M_{max}$ is the maximum value of M which can be used in the system or the maximum value of M which is set in the device. The value N may be a maximum value of N(i) satisfying $M_{max}/N(i)$>r or a minimum value of N(i) satisfying $M_{max}/N(i)$<r. r is a parameter, and information regarding the value r may be transferred from a base station to a wireless device through RRC signaling or the like.

In a fourth embodiment, the value N may be determined by a reference code rate R determined according to the value M. The number M of bits actually transmitted on a control channel may vary depending on an aggregation level of a unit resource. The reference code rate R is set for each aggregation level, and the value N may be determined according to R. When R(k) is a reference code rate of an aggregation level k and R(k+1) is a reference code rate of an aggregation level k+1, then R(k)>=R(k+1) may be satisfied if k<k+1. A poor channel situation may be overcome in such a manner that the more the wireless resources in use, the lower the code rate to be applied. The value N may be the value N(i) when K/N(i) is closest to R. Alternatively, the value N may be a maximum value of N(i) which satisfies K/N(i)>R or a minimum value N(i) which satisfies K/N(i)<R. Information regarding a reference code rate corresponding to each aggregation level may be transmitted from the base station to the wireless device through RRC signaling or the like.

In a fifth embodiment, a maximum value of N may be limited in the above embodiment. This is because a coding gain is significantly small when a mother code code rate K/N is significantly small, whereas only encoding/decoding complexity may increase. When Nmax is the maximum value of N, the value Nmax may be selected from available values N(i). Nmax may be determined based on K. The greater the K, the greater the Nmax. For example, the value Nmax may be the greatest value satisfying K/N(i)>Rmin among the available values N(i). Alternatively, the value Nmax may be the smallest value satisfying K/N(i)<Rmin among the available values N(i). Rmin is a minimum value of the mother code code rate. Rmin may be transferred from the base station to the wireless device through RRC signaling or the like.

Due to a limitation of the maximum value of N, if the value N is smaller than the value M, (M−N) bits may be added to output N bits of a mother code for control channel transmission. The added (M−N) bits may be selected from the output N bits.

Assume that N1 is the value N selected in the above first to fourth embodiments. When the maximum value of N is applied, it may be finally determined such as N=min(N1, Nmax).

In a sixth embodiment, the minimum value of N may be limited in the above embodiment. This is because a coding gain is significantly small when a mother code code rate K/N is significantly great, which may result in poor decoding performance. When Nmin is the minimum value of N, the value Nmin may be selected from available values N(i). Nmin may be determined based on K. The greater the K, the greater the Nmin. For example, the value Nmin may be the smallest value satisfying K/N(i)<Rmax among the available values N(i). Alternatively, the value Nmin may be the greatest value satisfying K/N(i)>Rmax among the available values N(i). Rmax may be transferred from the base station to the wireless device through RRC signaling or the like.

Due to a limitation of the minimum value of N, if the value N is greater than the value M, M bits selected from the output N bits of the mother code may be transmitted on a control channel.

Assume that N1 is the value N selected in the above first to fourth embodiments. When the minimum value of N is applied, it may be finally determined such as N=max(N1, Nmin).

If the maximum value of N and the minimum value of M are both applied, it may be determined such as N=max{min(N1, Nmax), Nmin} or N=min{max(N1, Nmin), Nmax}.

Figure 4:
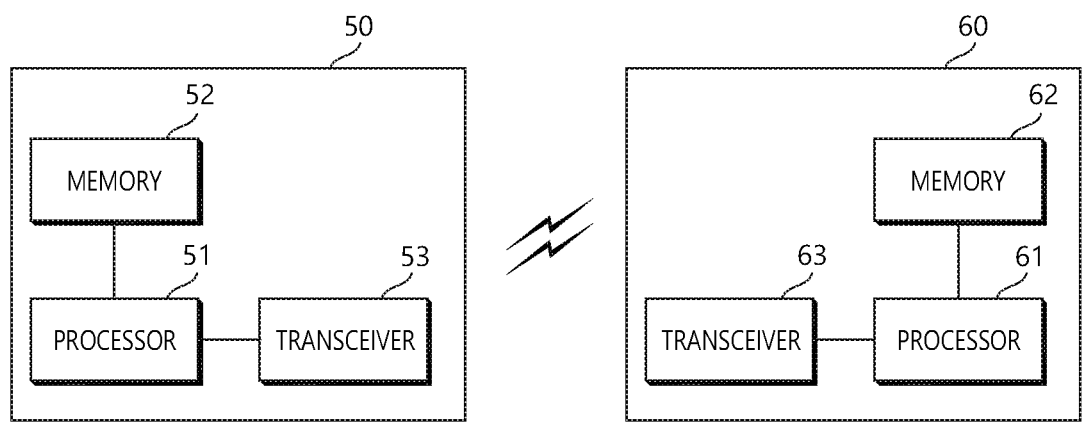
FIG. 4 is a block diagram showing a wireless communication system for implementing an embodiment of the present invention.

FIG. 4 is a block diagram showing a wireless communication system for implementing an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting control information by a transmitter in a wireless communication system, the method comprising:
   receiving a code rate for a control channel from a base station;
   determining a block size of a mother code based on the code rate;
   generating a codeword by encoding information bits related to the control information based on the mother code,
   wherein the codeword is a polar code; and
   transmitting the entirety or part of the codeword to a receiver through the control channel,
   wherein a value N of the block size is a power of 2, and
   wherein the block size is determined to be:
      the greatest power of 2, less than K/R; or
      the smallest power of 2, greater than K/R,
      where K denotes a number of the information bits and R denotes the code rate.

2. The method of claim 1, wherein the code rate is determined based on an amount of a radio resource used in the transmission of the control channel.

3. The method of claim 1,
   wherein the mother code includes the information bits, and
   wherein the codeword is generated by encoding the information bits and (N−K) frozen bits.

4. A device for transmitting control information in a wireless communication system, the apparatus comprising:
   a transceiver configured to transmit and receive a radio signal; and
   a processor operatively coupled to the transceiver and configured to:
   receive a code rate for a control channel from a base station by using the transceiver;
   determine a block size of a mother code based on the code rate;
   generate a codeword by encoding information bits related to the control information based on the mother code,
   wherein the codeword is a polar code; and
   transmit the codeword to a receiver through the control channel by using the transceiver,
   wherein a value N of the block size is a power of 2, and
   wherein the block size is determined to be:
      the greatest power of 2, less than K/R, or
      the smallest power of 2, greater than K/R,
      where K denotes a number of the information bits and R denotes the code rate.

5. The device of claim 4, wherein the code rate is determined based on an amount of a radio resource used in the transmission of the control channel.

6. The device of claim 4,
   wherein the mother code includes the information bits, and
   wherein the codeword is generated by encoding the information bits and (N−K) frozen bits.

* * * * *